United States Patent
Enomoto et al.

(10) Patent No.: US 12,466,763 B2
(45) Date of Patent: Nov. 11, 2025

(54) GLASS ARTICLE

(71) Applicant: NIPPON ELECTRIC GLASS CO., LTD., Otsu (JP)

(72) Inventors: Tomoko Enomoto, Otsu (JP); Shinsaku Nishida, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 671 days.

(21) Appl. No.: 17/767,686

(22) PCT Filed: Nov. 5, 2020

(86) PCT No.: PCT/JP2020/041303
§ 371 (c)(1),
(2) Date: Apr. 8, 2022

(87) PCT Pub. No.: WO2021/095622
PCT Pub. Date: May 20, 2021

(65) Prior Publication Data
US 2023/0286855 A1 Sep. 14, 2023

(30) Foreign Application Priority Data

Nov. 14, 2019 (JP) .................................. 2019-205957
Sep. 11, 2020 (JP) .................................. 2020-153031

(51) Int. Cl.
| | | |
|---|---|---|
| C03C 3/15 | (2006.01) | |
| A44C 17/00 | (2006.01) | |
| C03C 3/068 | (2006.01) | |
| C03C 3/095 | (2006.01) | |
| C03C 3/12 | (2006.01) | |
| C03C 3/14 | (2006.01) | |
| C03C 3/155 | (2006.01) | |
| C03C 4/02 | (2006.01) | |
| C03C 19/00 | (2006.01) | |

(52) U.S. Cl.
CPC ............ *C03C 3/155* (2013.01); *A44C 17/008* (2013.01); *C03C 3/068* (2013.01); *C03C 3/095* (2013.01); *C03C 3/12* (2013.01); *C03C 3/125* (2013.01); *C03C 3/14* (2013.01); *C03C 3/15* (2013.01); *C03C 4/02* (2013.01); *C03C 19/00* (2013.01); *C03C 2204/00* (2013.01)

(58) Field of Classification Search
CPC ........... C03C 3/15; C03C 3/155; C03C 3/068; C03C 3/12; C03C 4/02; A44C 17/008
See application file for complete search history.

(56) References Cited

U.S. PATENT DOCUMENTS

| | | | |
|---|---|---|---|
| 3,734,754 A * | 5/1973 | Randall et al. ............ | C03C 4/06 501/51 |
| 3,955,991 A * | 5/1976 | Young ...................... | C03C 1/10 501/51 |
| 3,999,996 A | 12/1976 | Faulstich et al. | |
| 4,125,405 A * | 11/1978 | Araujo ..................... | C03C 4/04 501/59 |
| 4,149,896 A | 4/1979 | Faulstich et al. | |
| 4,486,541 A | 12/1984 | Gliemeroth et al. | |
| 4,521,524 A | 6/1985 | Yamashita | |
| 4,891,336 A * | 1/1990 | Prassas ................... | C03C 3/064 501/13 |
| 5,242,869 A * | 9/1993 | Tarumi ..................... | C03C 4/02 501/78 |
| 5,612,102 A * | 3/1997 | Nakama ................ | A44C 17/005 63/32 |
| 2005/0170944 A1* | 8/2005 | Arbab ...................... | C03C 4/02 501/64 |
| 2008/0207429 A1* | 8/2008 | Izuki ...................... | C03C 3/068 501/78 |
| 2018/0090904 A1 | 3/2018 | Carré et al. | |
| 2022/0169558 A1* | 6/2022 | Fujita ...................... | C03C 3/068 |
| 2022/0185722 A1* | 6/2022 | Fujita ...................... | C03C 3/15 |
| 2023/0286854 A1* | 9/2023 | Enomoto ................ | C03C 3/125 |

FOREIGN PATENT DOCUMENTS

| | | | | |
|---|---|---|---|---|
| EP | 3339262 A1 * | 6/2018 | ............ | C03C 10/00 |
| JP | S49-026314 A | 3/1974 | | |
| JP | S57-183336 A | 11/1982 | | |
| JP | S58-049641 A | 3/1983 | | |
| JP | S61-083644 A | 4/1986 | | |
| JP | S62-128943 A | 6/1987 | | |
| JP | S62-153144 A | 7/1987 | | |
| JP | 2006-001808 A | 1/2006 | | |

OTHER PUBLICATIONS

First Chinese Office Action issued Feb. 1, 2024 in Application No. 202080078474.1, including machine translation and partial human translation.
Second Chinese Office Action issued Jul. 28, 2024 in Application No. 202080078474. 1.
Fritsch, Emmanuel et al., "Gem-Quality Cuprian-Elbaite Tourmalines From São Jose Da Batalha, Paraíba, Brazil," Gems & Gemology, Fall 1990, vol. 26, No. 3, pp. 189-204.
International Search Report mailed Dec. 28, 2020 for PCT/JP2020/041303.
Written Opinion of the International Searching Authority mailed Dec. 28, 2020 for PCT/JP2020/041303.
CN Office Action issued Dec. 21, 2024 in Chinese Application No. 202080078474. 1 (with attached machine English-language translation), (12 pages).

(Continued)

*Primary Examiner* — Elizabeth A. Bolden

(74) *Attorney, Agent, or Firm* — Faegre Drinker Biddle & Reath LLP

(57) ABSTRACT

A glass article contains: in mol %, more than 0% to 70% of $La_2O_3$, 0% to 80% of $B_2O_3$, 0% to 40% of $SiO_2$, 0% to 80% of $B_2O_3+Al_2O_3+SiO_2$, 0% to 85% of $Gd_2O_3+Ga_2O_3+Y_2O_3+Yb_2O_3+ZrO_2+TiO_2+Nb_2O_5+Ta_2O_5+WO_3$, 0% to 15% of $MgO+CaO+SrO+BaO$, 0% to 35% of ZnO, and more than 0% to 5% of CuO.

8 Claims, 1 Drawing Sheet

(56) References Cited

OTHER PUBLICATIONS

Japanese Office Action issued Oct. 23, 2024 in Application No. 2021-556050.
Notice of Reasons for Refusal mailed Mar. 19, 2025 for the corresponding Japanese patent application No. 2021-556050.
Chinese Office Action issued Mar. 12, 2025 in Application No. 202080078474.1.

* cited by examiner

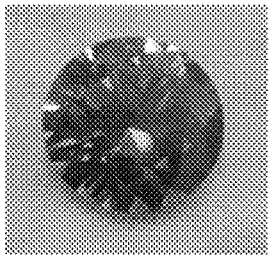
No. 8
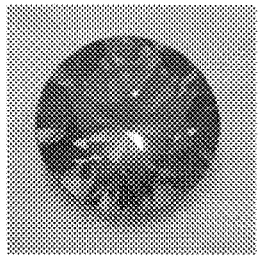
No. 9
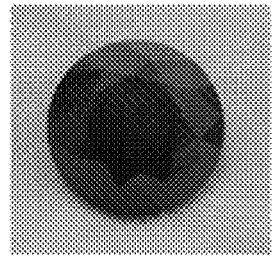
No. 39

GLASS ARTICLE

TECHNICAL FIELD

The present invention relates to a glass article suitable for decoration purposes, such as a ring, a pendant, an earring, or a bracelet.

BACKGROUND ART

Paraiba Tourmaline is known as a jewel with vivid neon blue or neon green (see, for example, non-Patent literature 1). Neon blue or neon green of Paraiba Tourmaline is color development by copper ions and manganese ions, and the color tone changes due to the content of these ions. At present, a jewel having a similar color tone is not known.

CITATION LIST

Patent Literature

Non-Patent Literature 1: Gems & Gemology, Fall 1990, Vol. 26, No. 3, 189-204

SUMMARY OF INVENTION

Technical Problem

Paraiba Tourmaline with vivid neon blue or neon green has very little production volume and has a problem of being easy to crack because it has many inclusions and cracks. There is Tourmaline, another ore, having a color tone close to that of Paraiba Tourmaline, but since the refractive index is low as 1.62 to 1.64, sufficient brilliance is not obtained when used as a decoration.

In view of the above, an object of the present invention provides a novel article excellent in brilliance and having a color tone of vivid neon blue or neon green.

Solution to Problem

As a result of diligent studies, the present inventors have found that the above problem can be solved with a glass article having a composition containing CuO with a base glass containing $La_2O_3$ as an essential component.

That is, a glass article according to the present invention contains: in mol %, more than 0% to 70% of $La_2O_3$, 0% to 80% of $B_2O_3$, 0% to 40% of $SiO_2$, 0% to 80% of $B_2O_3+Al_2O_3+SiO_2$, 0% to 85% of $Gd_2O_3+Ga_2O_3+Y_2O_3+Yb_2O_3+ZrO_2+TiO_2+Nb_2O_5+Ta_2O_5+WO_3$, 0% to 15% of $MgO+CaO+SrO+BaO$, 0% to 35% of ZnO, and more than 0% to 5% of CuO. In the present description, "x+y+ . . ." means a total amount of components.

The glass article according to the present invention preferably contains $B_2O_3+Al_2O_3+SiO_2$ in an amount of more than 0% to 80% in mol %.

The glass article according to the present invention preferably contains $Gd_2O_3+Ga_2O_3+Y_2O_3+Yb_2O_3+ZrO_2+TiO_2+Nb_2O_5+Ta_2O_5+WO_3$ in an amount of more than 0% to 85% in mol %.

The glass article according to the present invention may further contain a coloring component composed of an oxide of V, Cr, Mn, Fe, Co, Ni, Mo, Ru, Ce, Pr or Er in an amount of 0% to 20% in mol %. Accordingly, the color tone of the glass article can be arranged in various ways.

The glass article according to the present invention preferably has a refractive index of 1.7 or more. When the refractive index of the glass article is large, the difference in refractive index between the inside and the outside (atmosphere) of the glass article is large, and light is easily reflected inside the glass article. As a result, it is easy to obtain sufficient brilliance as a glass article.

The glass article according to the present invention preferably has an Abbe number of 50 or less. When the Abbe number of the glass article is small, the dispersion is high, and rainbow-colored brilliance called fire is likely to exhibit.

The glass article according to the present invention is preferably subjected to chamfering. Accordingly, light is easily reflected inside the glass article, and it is possible to enhance the brilliance.

The glass article according to the present invention is preferably used for decoration.

The glass article according to the present invention is preferably an artificial jewel.

A decoration according to the present invention includes the above glass article.

Advantageous Effects of Invention

According to the present invention, it is possible to provide a glass article excellent in brilliance and fire and having a color tone of vivid neon blue or neon green.

BRIEF DESCRIPTION OF DRAWINGS

FIG. 1 is a plane photograph showing samples Nos. 8, 9 and 39 in Examples.

DESCRIPTION OF EMBODIMENTS

A glass article according to the present invention contains: in mol %, more than 0% to 70% of $La_2O_3$, 0% to 80% of $B_2O_3$, 0% to 40% of $SiO_2$, 0% to 80% of $B_2O_3+Al_2O_3+SiO_2$, 0% to 85% of $Gd_2O_3+Ga_2O_3+Y_2O_3+Yb_2O_3+ZrO_2+TiO_2+Nb_2O_5+Ta_2O_5+WO_3$, 0% to 15% of $MgO+CaO+SrO+BaO$, 0% to 35% of ZnO, and more than 0% to 5% of CuO. The reason for limiting the glass composition in this way will be described below. In the following description of the content of each component, "%" means "mol %" unless otherwise specified.

$La_2O_3$ is a component that forms a network of a glass and is a component that increases the refractive index without lowering the transmittance. In addition, $La_2O_3$ also has an effect of improving weather resistance. The content of $La_2O_3$ is preferably more than 0% to 70%, 5% to 68%, 8% to 65%, 14% to 63%, and particularly preferably 20% to 63%. When the content of $La_2O_3$ is too small, it is difficult to obtain the above effects. On the other hand, when the content of $La_2O_3$ is too large, vitrification is difficult.

$B_2O_3$ is a component that forms a network of a glass and expands the vitrification range. The content of $B_2O_3$ is preferably 0% to 80%, 3% to 70%, 5% to 50%, and particularly preferably 10% to 40%. When the content of $B_2O_3$ is too large, the refractive index decreases, making it difficult to obtain desired optical properties.

$SiO_2$ is a component that forms a network of a glass and expands the vitrification range. The content of $SiO_2$ is preferably 0% to 40%, 1% to 30%, and particularly preferably 3% to 20%. When the content of $SiO_2$ is too large, the refractive index decreases, making it difficult to obtain desired optical properties.

In order to facilitate vitrification, it is preferable to adjust the content of $B_2O_3+Al_2O_3+SiO_2$. The content of $B_2O_3+Al_2O_3+SiO_2$ is preferably 0% or more, more than 0%, 0.1% or more, 3% or more, and particularly preferably 5% or more. However, when the content of $B_2O_3+Al_2O_3+SiO_2$ is too large, the refractive index decreases, making it difficult to obtain desired optical properties, and is thus preferably 80% or less, 75% or less, and particularly preferably 70% or less.

$Al_2O_3$ is a component that forms a network of a glass and expands the vitrification range. However, when the content of $Al_2O_3$ is too large, the refractive index decreases, making it difficult to obtain desired optical properties. Therefore, the content of $Al_2O_3$ is preferably 0% to 80%, 1% to 75%, and particularly preferably 3% to 70%.

$Gd_2O_3$, $Ga_2O_3$, $Y_2O_3$, $Yb_2O_3$, $ZrO_2$, $TiO_2$, $Nb_2O_5$, $Ta_2O_5$, and $WO_3$ are components that increase the refractive index, reduce the Abbe number to increase the dispersion, and expand the vitrification range. The content of $Gd_2O_3+Ga_2O_3+Y_2O_3+Yb_2O_3+ZrO_2+TiO_2+Nb_2O_5+Ta_2O_5+WO_3$ is preferably 0% to 85%, more than 0% to 85%, 1% to 80%, 5% to 75%, and particularly preferably 10% to 70%.

When the content of content of $Gd_2O_3+Ga_2O_3+Y_2O_3+Yb_2O_3+ZrO_2+TiO_2+Nb_2O_5+Ta_2O_5+WO_3$ is too large, vitrification is difficult. When two or more selected from $Gd_2O_3$, $Ga_2O_3$, $Y_2O_3$, $Yb_2O_3$, $ZrO_2$, $TiO_2$, $Nb_2O_5$, $Ta_2O_5$, and $WO_3$ are contained, the total amount is also preferably within the above range.

Hereinafter, each component $Gd_2O_3$, $Ga_2O_3$, $Y_2O_3$, $Yb_2O_3$, $ZrO_2$, $TiO_2$, $Nb_2O_5$, $Ta_2O_5$, and $WO_3$ will be described in detail.

$Gd_2O_3$ is a component that increases the refractive index. In addition, $Gd_2O_3$ also has an effect of improving weather resistance. However, when the content of $Gd_2O_3$ is too large, vitrification is difficult. Therefore, the content of $Gd_2O_3$ is preferably 0% to 45%, 0.1% to 40%, 1% to 35%, 3% to 30%, and particularly preferably 5% to 20%.

$Ga_2O_3$ is a component that increases the refractive index. In addition, since $Ga_2O_3$, as an intermediate oxide, forms a network of a glass, $Ga_2O_3$ has an effect of expanding the vitrification range. However, when the content of $Ga_2O_3$ is too large, vitrification is difficult, and the cost of raw materials tends to be high. Therefore, the content of $Ga_2O_3$ is preferably 0% to 50%, 5% to 40%, 10% to 35%, and particularly preferably 15% to 30%. When the cost of raw materials is prioritized, the content of $Ga_2O_3$ is preferably 0% to 30%, 0% to 20%, and particularly preferably 0% to 10%.

$Y_2O_3$ is a component that increases the refractive index. In addition, since $Y_2O_3$, as an intermediate oxide, forms a network of a glass, $Y_2O_3$ has an effect of expanding the vitrification range. However, when the content of $Y_2O_3$ is too large, vitrification is difficult. Therefore, the content of $Y_2O_3$ is preferably 0% to 50%, 0% to 30%, 0% to 20%, and particularly preferably 0% to 10%.

$Yb_2O_3$ is a component that increases the refractive index. However, when the content of $Yb_2O_3$ is too large, vitrification is difficult. Therefore, the content of $Yb_2O_3$ is preferably 0% to 50%, 0% to 30%, 0% to 20%, and particularly preferably 0% to 10%.

$ZrO_2$ is a component that increases the refractive index. In addition, since $ZrO_2$, as an intermediate oxide, forms a network of a glass, $ZrO_2$ has an effect of expanding the vitrification range. However, when the content of $ZrO_2$ is too large, vitrification is difficult and the melting temperature becomes too high. Therefore, the content of $ZrO_2$ is preferably 0% to 40%, 0.1% to 35%, 1% to 30%, 3% to 25%, and particularly preferably 5% to 20%.

$TiO_2$ is a component that has a large effect of increasing the refractive index, and also has an effect of increasing chemical durability. In addition, $TiO_2$ also has an effect of reducing the Abbe number and increasing the dispersion. The content of $TiO_2$ is preferably 0% to 85%, 0.1% to 83%, 5% to 80%, and particularly preferably 10% to 75%. When the content of $TiO_2$ is too large, the absorption end shifts to the long wavelength side, so that the transmittance of visible light (particularly visible light in the short wavelength region) tends to decrease, and vitrification is difficult.

$Nb_2O_5$ is a component that has a large effect of increasing the refractive index, and is a component that reduces the Abbe number to increase the dispersion. $Nb_2O_5$ also has the effect of expanding the vitrification range. The content of $Nb_2O_5$ is preferably 0% to 85%, 0.5% to 75%, 1% to 73%, and particularly preferably 2% to 70%. When the content of $Nb_2O_5$ is too large, vitrification is difficult.

$Ta_2O_5$ is a component that has a great effect of increasing the refractive index. However, when the content of $Ta_2O_5$ is too large, vitrification is difficult, and the cost of raw materials tends to be high. Therefore, the content of $Ta_2O_5$ is preferably 0% to 60%, 0% to 50%, 0% to 45%, and particularly preferably 0.1% to 40%.

$WO_3$ is a component that increases the refractive index. In addition, since $WO_3$, as an intermediate oxide, forms a network of a glass, $WO_3$ has an effect of expanding the vitrification range. However, when the content of $WO_3$ is too large, vitrification is difficult. Therefore, the content of $WO_3$ is preferably 0% to 50%, 0% to 30%, 0% to 20%, and particularly preferably 0% to 10%.

MgO, CaO, SrO and BaO are components that expand the vitrification range. The content of MgO+CaO+SrO+BaO is 0% to 15%, and preferably 0% to 10%. When the content of MgO+CaO+SrO+BaO is too large, the refractive index decreases, making it difficult to obtain desired optical properties.

ZnO is a component that expands the vitrification range, and has the effect of enhancing the thermal stability of the glass. The content of ZnO is 0% to 35%, and preferably 0% to 30%. When the content of ZnO is too large, the refractive index decreases, making it difficult to obtain desired optical properties.

CuO is a blue coloring component, and when contained in the glass a color tone of vivid neon blue or neon green is provided. The content of CuO is preferably more than 0% to 5%, 0.01% to 3%, 0.05% to 2%, and particularly preferably 0.1% to 1%. When the content of CuO is too large, the coloring of the glass is increased. In the present invention, the content of CuO indicates all Cu components contained in the glass in terms of CuO. It is preferable that Cu in the glass is in the state of six-coordinate $Cu^{2+}$. When $Cu^+$ increases in the glass, blue coloring becomes light, and when four-coordinate $Cu^{2+}$ increases, the glass becomes brown and it is difficult to obtain a glass with neon blue. In particular, in a glass containing a large amount of high refractive index components such as $TiO_2$ and $Nb_2O_5$, the tendency that four-coordinate $Cu^{2+}$ increases is remarkable. Therefore, the proportion of six-coordinate $Cu^{2+}$ to all Cu in the glass is preferably 80 mol % or more, and particularly preferably 90 mol % or more.

When the glass article according to the present invention positively contains components that expand the vitrification range, such as $La_2O_3$, $Nb_2O_5$, and $B_2O_3$, it is easy to prevent unreasonable crystallization during glass production and to increase the size of the glass article (for example, for diameter, 2 mm or more, 3 mm or more, 4 mm or more, 5 mm or more, and particularly 6 mm or more).

The glass article according to the present invention may contain the following components in addition to the above components.

$P_2O_5$ is a component that forms a network of a glass and expands the vitrification range. However, when the content of $P_2O_5$ is too large, the refractive index decreases, making it difficult to obtain desired optical properties. Therefore, the content of $P_2O_5$ is preferably 0% to 20%, 0% to 15%, and particularly preferably 0% to 10%.

$Li_2O$, $Na_2O$, and $K_2O$ are components that expand the vitrification range. However, when the content of $Li_2O+Na_2O+K_2O$ is too large, the refractive index decreases, making it difficult to obtain desired optical properties, and the weather resistance decreases. Therefore, the content of $Li_2O+Na_2O+K_2O$ is preferably 0% to 20%, 0% to 15%, and particularly preferably 0% to 10%. It is preferable that the content of each component $Li_2O$, $Na_2O$, and $K_2O$ is also within the above range.

$Bi_2O_3$ is a component that increases the refractive index. However, when the content of $Bi_2O_3$ is too large, the glass is colored with yellow or red, it is difficult to obtain a glass with a desired color tone. Therefore, the content of $Bi_2O_3$ is preferably 0% to 20%, 0% to 15%, 0% to 10%, 0% to 5%, 0% to 1%, and most preferably $Bi_2O_3$ is substantially not contained. Here, the expression "is substantially not contained" means not intentionally contained in the raw material, and does not exclude the inclusion of unavoidable impurities. Objectively, it means that the content is less than 0.1%.

When a coloring component composed of an oxide of V, Cr, Mn, Fe, Co, Ni, Mo, Ru, Ce, Pr or Er is contained, the glass article can be adjusted to a desired color tone. These coloring components may be used alone or in combination of two or more thereof. The content of these oxides (the total amount when two or more types are contained) is preferably 0% to 20%, 0.001% to 10%, 0.005% to 5%, and particularly preferably 0.01% to 1%. Depending on the components contained, the coloring may become too strong, the visible light transmittance may decrease, and the desired brilliance or fire may not be obtained. In this case, the content of the oxide may be less than 1%, 0.5% or less, and 0.1% or less.

The glass article according to the present invention preferably has a refractive index (nd) of 1.7 or more, 1.8 or more, 1.9 or more, 1.95 or more, and particularly preferably 2.0 or more. Accordingly, the difference in refractive index between the inside and the outside (atmosphere) of the glass article is large, and light is easily reflected inside the glass article. As a result, it is easy to obtain sufficient brilliance as a decorative glass article. The upper limit of the refractive index is not particularly limited. When the upper limit thereof is too large, vitrification becomes unstable, so that the upper limit is preferably 2.6 or less, 2.5 or less, and particularly preferably 2.4 or less.

The glass article according to the present invention preferably has an Abbe number (vd) of 50 or less, 45 or less, and particularly preferably 43 or less. Accordingly, the glass article is highly dispersed, and fire is likely to exhibit. The lower limit of the Abbe number is not particularly limited. When the lower limit thereof is too small, vitrification becomes unstable, so that the lower limit is preferably 10 or more, and particularly preferably 15 or more.

The glass article according to the present invention can be used for decoration purposes such as jewelry, works of art, and tableware. For example, the glass article according to the present invention can be attached to decorations (jewelry) such as a ring, a pendant, an earring, or a bracelet as artificial jewels. The shape of the decorative glass article is not particularly limited, and examples thereof include a spherical shape, an elliptical shape, and a polyhedron.

The glass article according to the present invention is preferably subjected to chamfering with so-called brilliant cut, step cut, mixed cut, and the like. Accordingly, light is easily reflected inside the glass article, and it is possible to enhance the brilliance, so that the glass article according to the present invention is particularly suitable as an artificial jewel.

EXAMPLES

Hereinafter, the glass article according to the present invention will be described in detail with reference to Examples, but the present invention is not limited to the following Examples.

Tables 1 to 4 show Examples (Nos. 1 to 36) and Comparative Examples (Nos. 37 to 39) of the present invention.

TABLE 1

| mol % | No. 1 | No. 2 | No. 3 | No. 4 | No. 5 | No. 6 | No. 7 | No. 8 | No. 9 | No. 10 |
|---|---|---|---|---|---|---|---|---|---|---|
| $La_2O_3$ | 40.36 | 26.97 | 32.96 | 26.93 | 26.97 | 37.92 | 35.36 | 26.97 | 34.96 | 34.96 |
| $B_2O_3$ | 32.96 | 36.96 | 32.96 | 32.92 | 32.96 | 18.96 | 29.47 | 34.96 | 21.98 | 21.98 |
| $Al_2O_3$ | 0.1 | 0.2 | 1 | | 4 | | | | | |
| $SiO_2$ | 4 | | 4 | 3.99 | | 9.98 | 10.89 | 4 | 4 | 4 |
| $Gd_2O_3$ | 11.49 | 11.49 | 5 | 10.97 | 11.69 | 14.97 | 15.48 | 11.49 | 13.99 | 9.99 |
| $Ga_2O_3$ | | | | | | | | | | |
| $Yb_2O_3$ | | | | | 2 | | | | | |
| $ZrO_2$ | 8.99 | 8.99 | 10.99 | 9.07 | 8.99 | | | 8.99 | 6.99 | 6.99 |
| $TiO_2$ | | | | | | | | | | |
| $Nb_2O_5$ | 2 | 1.9 | | 1.9 | 1.9 | 6.99 | 1.5 | 2.1 | 2 | 2 |
| $Ta_2O_5$ | | 11.39 | 10.99 | 11.97 | 11.39 | 10.98 | 7.2 | 11.39 | 15.98 | 19.98 |
| $WO_3$ | | | | 2 | | | | | | |
| $Li_2O$ | | | | | | | | | | |
| BaO | | 2 | | | | | | | | |
| ZnO | | | 2 | | | | | | | |
| CuO | 0.1 | 0..1 | 0.1 | 0.1 | 0.1 | 0.2 | 0.1 | 0.1 | 0.1 | 0.1 |
| $Fe_2O_3$ | | | | 0.15 | | | | | | |
| $B_2O_3 +$ $Al_2O_3 + SiO_2$ | 37.06 | 37.16 | 37.96 | 36.91 | 36.96 | 28.94 | 40.36 | 38.96 | 25.98 | 25.98 |

TABLE 1-continued

| mol % | No. 1 | No. 2 | No. 3 | No. 4 | No. 5 | No. 6 | No. 7 | No. 8 | No. 9 | No. 10 |
|---|---|---|---|---|---|---|---|---|---|---|
| $Gd_2O_3 + Ga_2O_3 + Y_2O_3 + Yb_2O_3 + ZrO_2 + TiO_2 + Nb_2O_5 + Ta_2O_5 + WO_3$ | 22.48 | 33.77 | 26.98 | 35.91 | 35.97 | 32.94 | 24.18 | 33.97 | 38.96 | 38.96 |
| $MgO + CaO + SrO + BaO$ | 0 | 2 | 0 | 0 | 0 | 0 | 0 | 0 | 0 | 0 |
| Refractive index nd | 1.91 | 1.95 | 1.95 | 1.96 | 1.95 | 2.00 | 1.93 | 1.95 | 2.01 | 2.02 |
| Abbe number vd | 40.9 | 37.5 | 37.4 | 36.5 | 37.9 | 34.6 | 40.0 | 37.3 | 34.8 | 34.1 |
| Color tone | Neon blue | Neon blue | Neon blue | Neon blue | Neon blue | Neon green | Neon blue | Neon green | Neon blue | Neon green |
| Brilliance | A | A | A | A | A | A | A | A | A | A |
| Fire | A | A | A | A | A | A | A | A | A | A |

TABLE 2

| mol % | No. 11 | No. 12 | No. 13 | No. 14 | No. 15 | No. 16 | No. 17 | No. 18 | No. 19 | No. 20 |
|---|---|---|---|---|---|---|---|---|---|---|
| $La_2O_3$ | 34.96 | 34.97 | 8.68 | 11.89 | 29.93 | 29.97 | 19.94 | 14.99 | 49.85 | 59.85 |
| $B_2O_3$ | 21.98 | 21.98 | 35.2 | 24.27 | 69.82 | | 19.94 | 29.97 | 29.91 | 29.93 |
| $Al_2O_3$ | | | | | | 69.93 | | | | |
| $SiO_2$ | 4 | 4 | 8.68 | 15.08 | | | | | | |
| $Gd_2O_3$ | 9.99 | 9.99 | 2.99 | 4.5 | | | | | | |
| $Ga_2O_3$ | | | | | | | | | | |
| $Yb_2O_3$ | | | | | | | | | | |
| $ZrO_2$ | 10.99 | 6.99 | 5.59 | 6.59 | | | | | | |
| $TiO_2$ | | | | | | | 29.91 | 24.97 | | |
| $Nb_2O_5$ | 2 | 5.99 | 2.69 | 1.3 | | | 29.91 | 29.97 | 19.94 | 9.98 |
| $Ta_2O_5$ | 15.98 | 15.98 | 2 | 4.7 | | | | | | |
| $WO_3$ | | | | 1.2 | | | | | | |
| $Li_2O$ | | | 5.19 | 3 | | | | | | |
| BaO | | | | | | | | | | |
| ZnO | | | 27.53 | 28.57 | | | | | | |
| CuO | 0.1 | 0.1 | 0.15 | 0.1 | 0.1 | 0.1 | 0.3 | 0.1 | 0.3 | 0.25 |
| $Fe_2O_3$ | | | 0.1 | | | 0.15 | | | | |
| $B_2O_3 + Al_2O_3 + SiO_2$ | 25.98 | 25.98 | 43.88 | 39.35 | 69.82 | 69.93 | 19.94 | 29.97 | 29.91 | 29.93 |
| $Gd_2O_3 + Ga_2O_3 + Y_2O_3 + Yb_2O_3 + ZrO_2 + TiO_2 + Nb_2O_5 + Ta_2O_5 + WO_3$ | 38.96 | 38.95 | 14.47 | 17.09 | 0 | 0 | 59.82 | 54.94 | 19.94 | 9.98 |
| $MgO + CaO + SrO + BaO$ | 0 | 0 | 0 | 0 | 0 | 0 | 0 | 0 | 0 | 0 |
| Refractive index nd | 2.00 | 2.02 | 1.81 | 1.85 | 1.77 | 1.77 | 2.22 | 2.14 | 2.04 | 1.98 |
| Abbe number vd | 35.1 | 33.4 | 40.9 | 40.1 | 50.0 | 44.8 | 19.8 | 19.9 | 30.6 | 34.4 |
| Color tone | Neon blue | Neon green | Neon blue | Neon blue | Neon blue | Neon blue | Neon green | Neon green | Neon blue | Neon blue |
| Brilliance | A | A | B | B | B | B | A | A | A | A |
| Fire | A | A | B | B | B | B | A | A | A | A |

TABLE 3

| mol % | No. 21 | No. 22 | No. 23 | No. 24 | No. 25 | No. 26 | No. 27 | No. 28 | No. 29 | No. 30 |
|---|---|---|---|---|---|---|---|---|---|---|
| $La_2O_3$ | 39.88 | 49.93 | 39.9 | 49.88 | 29.91 | 29.91 | 39.92 | 49.95 | 39.92 | 39.76 |
| $B_2O_3$ | 29.91 | 29.95 | 10 | | | | 14.97 | | | 39.76 |
| $Al_2O_3$ | | | | | | | | | 29.94 | |
| $SiO_2$ | | | | | | | | | | |
| $Gd_2O_3$ | | | | | | | | | | |

TABLE 3-continued

| mol % | No. 21 | No. 22 | No. 23 | No. 24 | No. 25 | No. 26 | No. 27 | No. 28 | No. 29 | No. 30 |
|---|---|---|---|---|---|---|---|---|---|---|
| Ga$_2$O$_3$ | | | 19.9 | 29.95 | 49.85 | 29.91 | 14.97 | 19.98 | | |
| Yb$_2$O$_3$ | | | | | | | | | | |
| ZrO$_2$ | | | | | | | | | | |
| TiO$_2$ | | | | | | | | | | |
| Nb$_2$O$_5$ | | | 29.9 | 19.96 | | | | | | |
| Ta$_2$O$_5$ | 29.91 | 19.97 | | | 19.94 | 39.88 | 29.94 | 29.97 | 29.94 | 19.88 |
| WO$_3$ | | | | | | | | | | |
| Li$_2$O | | | | | | | | | | |
| BaO | | | | | | | | | | |
| ZnO | | | | | | | | | | |
| CuO | 0.3 | 0.15 | 0.3 | 0.2 | 0.3 | 0.3 | 0.2 | 0.1 | 0.2 | 0.6 |
| Fe$_2$O$_3$ | | | | | | | | | | |
| B$_2$O$_3$ + Al$_2$O$_3$ + SiO$_2$ | 29.91 | 29.95 | 10 | 0 | 0 | 0 | 14.97 | 0 | 29.94 | 39.76 |
| Gd$_2$O$_3$ + Ga$_2$O$_3$ + Y$_2$O$_3$ + Yb$_2$O$_3$ + ZrO$_2$ + TiO$_2$ + Nb$_2$O$_5$ + Ta$_2$O$_5$ + WO$_3$ | 29.91 | 19.97 | 49.8 | 49.91 | 69.79 | 69.79 | 44.91 | 49.95 | 29.94 | 19.88 |
| MgO + CaO + SrO + BaO | 0 | 0 | 0 | 0 | 0 | 0 | 0 | 0 | 0 | 0 |
| Refractive index nd | 1.99 | 2.02 | 2.07 | 2.06 | 2.02 | 2.08 | 2.04 | 2.07 | 2.01 | 1.94 |
| Abbe number vd | 34.1 | 30.7 | 26.9 | 28.8 | 32.4 | 29.2 | 31.9 | 31.3 | 33.4 | 37.6 |
| Color tone | Neon blue | Neon blue | Neon green | Neon blue | Neon blue | Neon blue | Neon blue | Neon blue | Neon green | Neon blue |
| Brilliance | A | A | A | A | A | A | A | A | A | A |
| Fire | A | A | A | A | A | A | A | A | A | A |

TABLE 4

| mol % | No. 31 | No. 32 | No. 33 | No. 34 | No. 35 | No. 36 | No. 37 | No. 38 | No. 39 |
|---|---|---|---|---|---|---|---|---|---|
| La$_2$O$_3$ | 39.82 | 34.9 | 34.89 | 39.82 | 39.88 | 34.9 | 1.6 | 35 | 25.6 |
| B$_2$O$_3$ | 49.77 | 49.84 | 39.88 | 44.8 | 39.88 | 24.93 | 4.89 | 22 | 33.2 |
| Al$_2$O$_3$ | | | | | | | 2.59 | | |
| SiO$_2$ | | | | | | | 50.27 | 4 | 3.8 |
| Gd$_2$O$_3$ | | | | | | | | 14 | 10.9 |
| Ga$_2$O$_3$ | | | 9.97 | | 4.99 | 19.94 | | | |
| Yb$_2$O$_3$ | | | | | | | | | |
| ZrO$_2$ | | | | | | | 1.9 | 7 | 8.5 |
| TiO$_2$ | | | | | | | | | |
| Nb$_2$O$_5$ | | | | | | | | 2 | 2 |
| Ta$_2$O$_5$ | 9.96 | 14.96 | 14.96 | 14.93 | 14.95 | 19.94 | | 16 | 10.8 |
| WO$_3$ | | | | | | | | | |
| Li$_2$O | | | | | | | 15.16 | | |
| Na$_2$O | | | | | | | 4.59 | | |
| CaO | | | | | | | 9.98 | | |
| SrO | | | | | | | 5.29 | | |
| BaO | | | | | | | 3.49 | | |
| ZnO | | | | | | | | | |
| CuO | 0.45 | 0.3 | 0.3 | 0.45 | 0.3 | 0.3 | 0.15 | | 5.2 |
| Fe$_2$O$_3$ | | | | | | | 0.1 | | |
| B$_2$O$_3$ + Al$_2$O$_3$ + SiO$_2$ | 49.77 | 49.84 | 39.88 | 44.8 | 39.88 | 24.93 | 57.75 | 26 | 36.97 |
| Gd$_2$O$_3$ + Ga$_2$O$_3$ + Y$_2$O$_3$ + Yb$_2$O$_3$ + ZrO$_2$ + TiO$_2$ + Nb$_2$O$_5$ + Ta$_2$O$_5$ + WO$_3$ | 9.96 | 14.96 | 24.93 | 14.93 | 19.94 | 39.88 | 1.9 | 39 | 32.2 |

TABLE 4-continued

| mol % | No. 31 | No. 32 | No. 33 | No. 34 | No. 35 | No. 36 | No. 37 | No. 38 | No. 39 |
|---|---|---|---|---|---|---|---|---|---|
| MgO + CaO + SrO + BaO | 0 | 0 | 0 | 0 | 0 | 0 | 18.76 | 0 | 0 |
| Refractive index nd | 1.91 | 1.92 | 1.94 | 1.95 | 1.95 | 1.98 | 1.61 | 2.01 | Not measured |
| Abbe number vd | 40.2 | 38.3 | 37.7 | 36.9 | 36.6 | 34.8 | 55.6 | 34.8 | Not measured |
| Color tone | Neon blue | Neon blue | Neon blue | Neon blue | Neon blue | Neon blue | Neon blue | Colorless | Black |
| Brilliance | A | A | A | A | A | A | C | A | C |
| Fire | A | A | A | A | A | A | C | A | C |

First, raw materials were mixed so as to have each glass composition shown in the tables to prepare a raw material batch. The obtained raw material batch was melted to be homogeneous, and then rapidly cooled to obtain a glass sample. The obtained glass sample was homogeneous and no defects such as cracks were observed on the surface. The melting temperature was set to 1400° C. to 1700° C. The obtained glass sample was annealed near the glass transition temperature (650° C. to 850° C.), and then the refractive index (nd) and the Abbe number (vd) were measured and the appearance (change in color tone, brilliance, fire) was evaluated according to the following methods.

The right-angle polishing was performed on the glass sample and the refractive index (nd) and the Abbe number (vd) were measured by using a precision refractometer (KPR-2000, manufactured by Shimadzu Corporation). The refractive index was evaluated by a measured value with respect to the d line (587.6 nm) of the helium lamp. The Abbe number was calculated according to the equation Abbe number $(vd)=\{(nd-1)/(nF-nC)\}$ using values of the refractive index of the d line and the refractive index of the F line (486.1 nm) and the C line (656.3 nm) of the hydrogen lamp.

The appearance was evaluated as follows. First, brilliant cut processing was performed such that the plane shape of each sample had a size of about 5 mm to 7 mm in diameter. The processed glass sample was visually evaluated for brilliance and fire under a fluorescent light source. The evaluation was performed in the following four stages. Plane photographs of the sample Nos. 8, 9 and 39 are shown in FIG. 1.

[Brilliance]

A: the sample looks bright and has strong brilliance.

B: the sample looks bright.

C: the sample has no brilliance (similar to a glass window).

[Fire]

A: the sample shows iridescent (various colors) brilliance.

B: the sample shows iridescent brilliance, but the number of colors is small.

C: the sample has almost no iridescent brilliance.

As is clear from Table 1, sample Nos. 1 to 36 which are Examples show a color tone with vivid neon blue or neon green, the brilliance is A, and the fire is B or A, which are good. On the other hand, sample No. 37 which is Comparative Example has a low refractive index of 1.61, a large Abbe number of 55.6, and C for the brilliance and the fire because of containing $SiO_2$ and MgO+CaO+SrO+BaO in large contents. Sample No. 38 is colorless because of not containing CuO. Sample No. 39 has a too dark color as black because of containing CuO in a too large content.

The invention claimed is:

1. A glass article comprising: in mol %, more than 0% to 70% of $La_2O_3$, 0% to 80% of $B_2O_3$, 0% to 40% of $SiO_2$, 0% to 80% of $B_2O_3+Al_2O_3+SiO_2$, 0.1% to 85% of $Gd_2O_3+Ga_2O_3+Y_2O_3+Yb_2O_3+ZrO_2+TiO_2+Nb_2O_5+Ta_2O_5+WO_3$, 0% to 15% of MgO+CaO+SrO+BaO, 0% to 35% of ZnO, 0.1% to 5% of CuO, and 0.1% to 45% of $Gd_2O_3$.

2. The glass article according to claim 1 comprising: in mol %, more than 0% to 80% of $B_2O_3+Al_2O_3+SiO_2$.

3. The glass article according to claim 1, further comprising: a coloring component comprising at least one oxide of V, Cr, Mn, Fe, Co, Ni, Mo, Ru, Ce, Pr or Er in an amount of 0% to 20% in mol % in aggregate.

4. The glass article according to claim 1, which has a refractive index of 1.7 or more.

5. The glass article according to claim 1, which has an Abbe number of 50 or less.

6. The glass article according to claim 1, which is subjected to chamfering.

7. A decoration comprising the glass article according to claim 1.

8. The decoration according to claim 7, wherein the decoration is an artificial jewel.

* * * * *